(12) United States Patent
Meyer et al.

(10) Patent No.: US 12,184,970 B2
(45) Date of Patent: Dec. 31, 2024

(54) CAMERA DEVICE, MOTOR VEHICLE, METHOD AND COMPUTER PROGRAM PRODUCT

(71) Applicant: Valeo Schalter und Sensoren GmbH, Bietigheim-Bissingen (DE)

(72) Inventors: Thorsten Meyer, Bietigheim-Bissingen (DE); Harald Barth, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 196 days.

(21) Appl. No.: 17/799,041

(22) PCT Filed: Feb. 9, 2021

(86) PCT No.: PCT/EP2021/053020
§ 371 (c)(1),
(2) Date: Aug. 11, 2022

(87) PCT Pub. No.: WO2021/160580
PCT Pub. Date: Aug. 19, 2021

(65) Prior Publication Data
US 2023/0071717 A1 Mar. 9, 2023

(30) Foreign Application Priority Data
Feb. 14, 2020 (DE) .................... 10 2020 103 882.8

(51) Int. Cl.
*H04N 23/65* (2023.01)
*B60R 1/22* (2022.01)
*H04N 23/52* (2023.01)
*H04N 23/951* (2023.01)

(52) U.S. Cl.
CPC ............. *H04N 23/651* (2023.01); *B60R 1/22* (2022.01); *H04N 23/52* (2023.01); *H04N 23/951* (2023.01)

(58) Field of Classification Search
CPC .... H04N 23/651; H04N 23/52; H04N 23/951; H04N 17/002; B60R 1/22
See application file for complete search history.

(56) References Cited

U.S. PATENT DOCUMENTS 5,752,011 A 5/1998 Thomas et al.
8,037,350 B1 * 10/2011 Aggarwal ........... G06F 11/1641
714/10

(Continued)

FOREIGN PATENT DOCUMENTS

CN 110169049 A 8/2019
CN 110626171 A 12/2019

(Continued)

OTHER PUBLICATIONS

Notification of Reason for Rejection in corresponding Japanese Application No. 2022-549080, dated Dec. 1, 2023 (24 pages).

(Continued)

*Primary Examiner* — Timothy J Henn (57) ABSTRACT

Described is a camera device (3) for a motor vehicle (1), having: a camera (4) for recording an image, a computing unit (8) for executing a program sequence (12) for providing at least part of a driver assistance function (13, 14, 15) depending on the recorded image, a provisioning unit (11) for providing a temperature of the computing unit (8), and a control unit (10), which is configured to modify the program sequence (12) depending on the provided temperature, the computing unit (8) being configured to execute the modified program sequence (12').

17 Claims, 3 Drawing Sheets

(56) References Cited

U.S. PATENT DOCUMENTS

| | | | |
|---|---|---|---|
| 10,126,715 B2* | 11/2018 | Tsuda | G06F 11/004 |
| 10,306,190 B1 | 5/2019 | Schofield et al. | |
| 10,435,029 B2* | 10/2019 | Fendt | B60W 50/0205 |
| 2003/0071913 A1* | 4/2003 | Yoshida | H04N 23/63 |
| | | | 348/E5.042 |
| 2008/0091974 A1 | 4/2008 | Nakashima | |
| 2015/0138359 A1 | 5/2015 | Masui | |
| 2015/0229816 A1 | 8/2015 | Tomiyasu | |
| 2016/0039414 A1* | 2/2016 | Kawai | B60W 30/0956 |
| | | | 701/28 |
| 2020/0139992 A1 | 5/2020 | Oba | |
| 2020/0288047 A1* | 9/2020 | Sugiyama | H04N 23/45 |
| 2021/0006755 A1* | 1/2021 | Kim | G06T 3/4046 |
| 2021/0075962 A1* | 3/2021 | Perwass | H04N 23/815 |
| 2022/0182523 A1* | 6/2022 | Ito | H01L 31/10 |

FOREIGN PATENT DOCUMENTS

| | | | |
|---|---|---|---|
| DE | 10205809 A1 | 12/2002 | |
| DE | 102016223709 A1 | 5/2018 | |
| EP | 3587162 A1 | 1/2020 | |
| JP | 2008-097280 A | 4/2008 | |
| JP | 2010510935 A | 4/2010 | |
| JP | 2010143387 A | 7/2010 | |
| JP | 2014-187497 A | 10/2014 | |
| JP | 2015-154179 A | 8/2015 | |
| JP | 2017032543 A | 2/2017 | |
| JP | 2019-062324 A | 4/2019 | |
| WO | 2019-017216 A1 | 1/2019 | |

OTHER PUBLICATIONS

Office Action Issued in Corresponding CN Application No. 202180014645.9, Dated Nov. 22, 2023. (25 Pages including English Translation].

International Search Report and Written Opinion in corresponding International Application No. PCT/EP2021/053020, mailed Mar. 30, 2021 (10 pages).

German Search Report in corresponding German Application No. 10 2020 103 882.8, dated Oct. 5, 2020 (9 pages).

* cited by examiner

CAMERA DEVICE, MOTOR VEHICLE, METHOD AND COMPUTER PROGRAM PRODUCT

The present invention relates to a camera device, a motor vehicle having the camera device, a method and a computer program product.

Vehicles are increasingly being equipped with cameras for monitoring the vehicle surroundings. An example is a front camera mounted on the inside of the front windshield of a vehicle. These are normally cameras incorporating camera optics, an image sensor, an image processor and a vehicle interface. However, in particular the camera mounted behind the windshield is exposed to sunlight and may become very hot as a result. Additionally, the image processor (video processor) in the camera may generate a significant amount of heat. Cooling the camera using the air conditioning system of the vehicle is usually not sufficient. As a result, there is the risk that the camera will overheat.

Conventionally, if there is the risk of the camera overheating, the video processor is shut down until its temperature has cooled enough for it to be started up again. However, all driver assistance functions based on image processing using the video processor are then temporarily unavailable. This applies firstly to comfort functions, such as automatic high beam, but also to safety functions, such as collision warning and automatic emergency braking. As a result, driver error during a shutdown state of the video processor may lead to an accident that could have been avoided if the driver assistance function had been available.

Against this background, it is an object of the present invention to provide an improved camera device.

Accordingly, a camera device for a vehicle is proposed. The camera device comprises:
- a camera for recording an image,
- a computer unit for executing a program sequence for providing at least part of a driver assistance function on the basis of the recorded image,
- a provisioning unit for providing a temperature for the computer unit, and
- a control unit, which is configured to alter the program sequence on the basis of the temperature provided,
- wherein the computer unit is configured to execute the altered program sequence.

Alteration of the driver assistance program sequence on the basis of the temperature of the computer unit and execution of the altered program sequence allow an unfavorable computer unit temperature value, for example a temperature value that is too high, to be avoided, while at the same time the program sequence can continue to run in altered form. As a result, complete shutdown of the computer unit in order to prevent the computer unit from overheating may be avoided. Consequently, driver assistance functions may continue to be made available to the driver of the vehicle even when the temperature of the computer unit is high.

The camera device is mounted in particular on or in a vehicle, such as a motor vehicle. The vehicle is, for example, an automobile, a truck, a bus, a motorcycle, an aircraft and/or a watercraft. The vehicle camera may also be used on or in vehicles that can be operated autonomously or at least semiautonomously.

The camera device is arranged, for example, on or under a window, in particular a front window, of the vehicle. The camera device is arranged, for example, on an inside of the front windshield and faces a direction of travel of the vehicle. In this case, the camera device may be referred to as a front camera device. The camera device may also be arranged at a different location on the vehicle and/or oriented in a different direction. The camera device comprises the camera for recording an image, in particular an image of surroundings of the vehicle. Suitable arrangement of the camera device allows appropriate monitoring areas in front of, behind, beside, above and/or below the vehicle to be monitored using the camera device. In particular, stationary or moving objects in the surroundings of the vehicle may be captured, such as vehicles, people, animals, plants, obstacles, bumps in the road (e.g. potholes or stones), roadway boundaries, road signs or open spaces (e.g. parking spaces).

The camera comprises in particular an optical system, in particular an objective, a lens or the like. Furthermore, the camera comprises in particular an image sensor, e.g. a CCD camera (charged coupled device) or a CMOS sensor (complementary metal-oxide semiconductor sensor). The camera comprises, for example, a printed circuit board on which electrical and/or electronic components, such as the image sensor, are arranged.

The camera device comprises, for example, a memory unit for storing the images recorded by the camera and other information.

The driver assistance function comprises, for example, speed assistance (adaptive speed control, distance control, ACC: adaptive cruise control), lane assistance, lane keeping assistance (LKA: lane keep assist), lane change assistance, emergency braking assistance (AEB: automatic emergency braking), steering assistance, emergency steering assistance (AES: automatic emergency steering), traffic jam assistance (TJA: traffic jam assist), light assistance and/or high beam assistance.

The units mentioned here, such as the computer unit and the control unit, may each be implemented in hardware and/or software. In the case of a hardware implementation, the applicable unit may be in the form of a device or in the form of part of a device, for example in the form of a computer or in the form of a microprocessor. By way of example, the device may comprise a central processing unit (CPU), a graphics processing unit (GPU), programmable hardware logic (e.g. a field programmable gate array, FPGA), an application-specific integrated circuit (ASIC) or the like. Additionally, the one or more units, such as the computer unit and the control unit, may be implemented together in a single hardware device, and they may share a memory, interfaces and the like, for example. The units, such as the computer unit and the control unit, may also be implemented in separate hardware components.

The driver assistance function(s) is (are) implemented in particular in software.

In the case of a software implementation, the respective unit (such as the computer unit and/or the control unit) and/or the driver assistance function may be in the form of a computer program product, in the form of a function, in the form of a computation routine, in the form of an algorithm, in the form of part of a program code or in the form of an executable object.

The one or more units, such as the computer unit and the control unit, are integrated in particular in the camera device, that is to say, for example, provided in one and the same housing. For example, they are provided in one and the same housing mounted on or under a windshield. In one embodiment, the control unit may also be in the form of part of a higher-level control system of the vehicle, such as a central electronic control device (vehicle control unit or ECU (electronic control unit)).

The computer unit and/or the control unit may also be used, for example, to control functions of the camera, in particular for image recording, and other camera settings. The computer unit may be used to evaluate and analyze information obtained using the camera.

According to one embodiment, the control unit is configured to alter the program sequence in such a way that a power consumption of the computer unit is reduced at least during the execution of the altered program sequence.

Reducing the power consumption of the computer unit allows heat generation by the camera device, in particular by the computer unit, to be reduced. In particular, complete shutdown of the computer unit may thus be better avoided.

According to a further embodiment, the control unit is configured to slow down the program sequence on the basis of the temperature provided.

Slowing down the program sequence allows heat generation by the camera device to be reduced.

According to a further embodiment, the control unit is configured to slow down the program sequence by reducing a clock rate of the computer unit and/or by reducing a frame rate of the camera.

Reducing the clock rate of the computer unit reduces the processing speed of the computer unit and thus the power consumption and heat generation thereof. Reducing the frame rate of the camera reduces the number of images to be processed by the computer unit per unit time and thus also the power consumption and heat generation of the computer unit.

According to a further embodiment, the control unit is configured to alter the program sequence for the duration of a vehicle state and/or a state of the vehicle surroundings.

As a result, the program sequence may be altered on the basis of a vehicle state and/or a state of the vehicle surroundings.

An example of a state of the vehicle surroundings is a brightness value for the daylight in the vehicle surroundings. An example of the alteration of the program sequence for the duration of a state of the vehicle surroundings is deactivating high beam assistance as long as the brightness value of the daylight is not below a predefined value, in other words as long as it is light enough for high beam assistance to be unnecessary.

Another example of a state of the vehicle surroundings is a distance from a vehicle traveling ahead. An example of the alteration of the program sequence for the duration of a state of the vehicle surroundings is deactivating other driver assistance functions, but not the collision assistant, as long as the distance from the vehicle traveling ahead is below a critical distance.

According to a further embodiment, the program sequence comprises a program sequence for providing a number M of driver assistance functions or at least particular parts thereof on the basis of the recorded image. Furthermore, the altered program sequence comprises a program sequence for providing a number N of driver assistance functions or at least particular parts thereof. In this case, N is smaller than M and/or the M driver assistance functions include the N driver assistance functions.

Consequently, the program sequence is used to provide multiple driver assistance functions (M driver assistance functions) or at least particular parts thereof. Furthermore, the program sequence for providing the M driver assistance functions—or at least particular parts thereof—may be altered by restricting it to a smaller number of N driver assistance functions—or at least particular parts thereof.

This allows selected driver assistance functions to be retained while others are deactivated.

By way of example, the M driver assistance functions comprise high beam assistance, emergency braking assistance and lane keeping assistance. By way of example, the N driver assistance functions comprise emergency braking assistance and lane keeping assistance, but not high beam assistance.

The M driver assistance functions in the program sequence may have a joint preprocessing section. In addition, the M driver assistance functions may each have a main processing section, which are in particular different from one another. The joint preprocessing section may consist of basic image processing that can be performed jointly for all or some of the driver assistance functions. The basic image processing may be, for example, image correction with regard to sensor errors, image artifacts, scattered light, contrast, etc.

In the case of a joint preprocessing section, the program sequence is used to provide a number M of driver assistance functions or at least particular parts of the respective main processing section. Additionally, in this case the altered program sequence is used to provide a number N of driver assistance functions or at least particular parts of the respective main processing section.

According to a further embodiment, the N driver assistance functions are safety-critical and the M driver assistance functions comprise at least one non-safety-critical driver assistance function.

As a result, the program sequence may be altered by deactivating non-safety-critical driver assistance functions while at the same time retaining safety-critical driver assistance functions. Safety-critical driver assistance functions are, in particular, driver assistance functions that are used to avoid accidents. Safety-critical driver assistance functions may also be driver assistance functions that are required by law.

According to a further embodiment, the computer unit and/or the control unit is configured to select the N driver assistance functions from the M driver assistance functions on the basis of a vehicle state and/or a state of the vehicle surroundings.

According to a further embodiment, the driver assistance function or one, several or all of the M and/or N driver assistance functions comprises communicating information and/or warning the driver of the vehicle and/or intervening in driving of the vehicle.

The driver assistance function or one, several or all of the M and/or N driver assistance functions has an SAE automation level of 1, 2, 3, 4 or 5, for example. The driver assistance function may be a function for autonomous driving or semi-autonomous driving, the vehicle being driven/controlled semi-automatically or fully automatically.

The SAE classification system, which is based on six different levels of automation, was published in 2014 by SAE International, a standardization organization for motor vehicles, as J3016, "Taxonomy and Definitions for Terms Related to On-Road Motor Vehicle Automated Driving Systems". It takes into account the level of system intervention and driver attention required. SAE automation levels range from level 0, which corresponds to a fully manual system, to level 5, which corresponds to a fully automatic system that eliminates the need for a driver. An autonomous vehicle (also known as a driverless car, self-driving car, and robotic car) is a vehicle capable of sensing its surroundings and navigating without human input, and conforms to SAE automation level 5.

According to a further embodiment, the computer unit comprises an image processor and/or video processor.

According to a further embodiment, the provisioning unit comprises a temperature sensor for providing the temperature of the computer unit.

As a result, the temperature of the computer unit may be measured by means of the temperature sensor.

The temperature sensor is, for example, a thermocouple, a thermistor (e.g. a PTC sensor (positive temperature coefficient sensor) or an NTC sensor (negative temperature coefficient sensor)), a semiconductor temperature sensor or another suitable temperature sensor.

Alternatively or additionally, the provisioning unit may provide the temperature of the computer unit, for example by evaluating a state of the vehicle surroundings, information from a navigation system and/or a GPS system.

According to a further embodiment, the control unit is configured to alter the program sequence if the temperature provided is higher than a threshold value.

This may prevent the camera device from overheating.

According to a further aspect, a motor vehicle having a camera device as described above is proposed.

According to a further aspect, a method for operating a camera device in a vehicle is proposed, having the steps of:
  recording an image using a camera,
  executing a program sequence to provide at least part of a driver assistance
  function on the basis of the recorded image,
  providing a temperature for the computer unit,
  altering the program sequence on the basis of the temperature provided, and
  executing the altered program sequence.

According to a further aspect, a computer program product is proposed that comprises commands that, when the program is executed by a computer, prompt said computer to carry out the method described above.

A computer program product, such as a computer program means, may be provided or delivered, for example, as a storage medium such as a memory card, USB stick, CD-ROM, DVD, or else in the form of a downloadable file from a server in a network. This may take place, for example, in a wireless communication network by way of the transmission of a corresponding file containing the computer program product or the computer program means.

The embodiments and features described for the proposed camera device apply correspondingly to the proposed motor vehicle, the proposed method and the proposed computer program product.

Further possible implementations of the invention also comprise combinations of features or embodiments described above or below with regard to the exemplary embodiments and that are not explicitly mentioned. A person skilled in the art will in this case also add individual aspects as improvements or additions to the respective basic form of the invention.

Further advantageous refinements and aspects of the invention are the subject of the dependent claims and of the exemplary embodiments of the invention that are described below. The invention is explained in more detail below on the basis of preferred embodiments with reference to the accompanying figures.

Identical or functionally identical elements have been provided with the same reference signs in the figures, unless stated otherwise.

Embodiments of a camera device for a motor vehicle, a method for operating the camera device and a corresponding computer program product are described below with reference to FIGS. 1 to 4.

Figure 1:
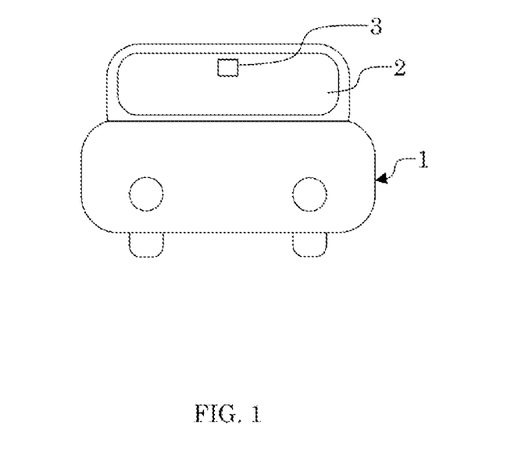
FIG. 1 shows a vehicle with a camera device.

FIG. 1 shows a motor vehicle 1. The motor vehicle 1 is an automobile in the example. In other examples, the motor vehicle 1 may also be a truck, bus or another motor vehicle. A camera device 3 is mounted on the inside of the front windshield 2 of the motor vehicle 1. The camera device 3 in the example is configured to monitor an area in front of the vehicle 1. The camera device 3 may be used for various driver assistance functions, such as object detection, lane keeping assistance and high beam assistance. In other examples, the camera device 3 may also be mounted at other positions in the motor vehicle 1 and/or oriented in other directions.

The camera device 3 has, for example, a housing and a lens barrel protruding therefrom (not shown). The camera device 3 is mounted on the windshield 2, for example by means of a frame or a bracket that is adhesively fixed to the windshield by fixing elements.

Figure 2:
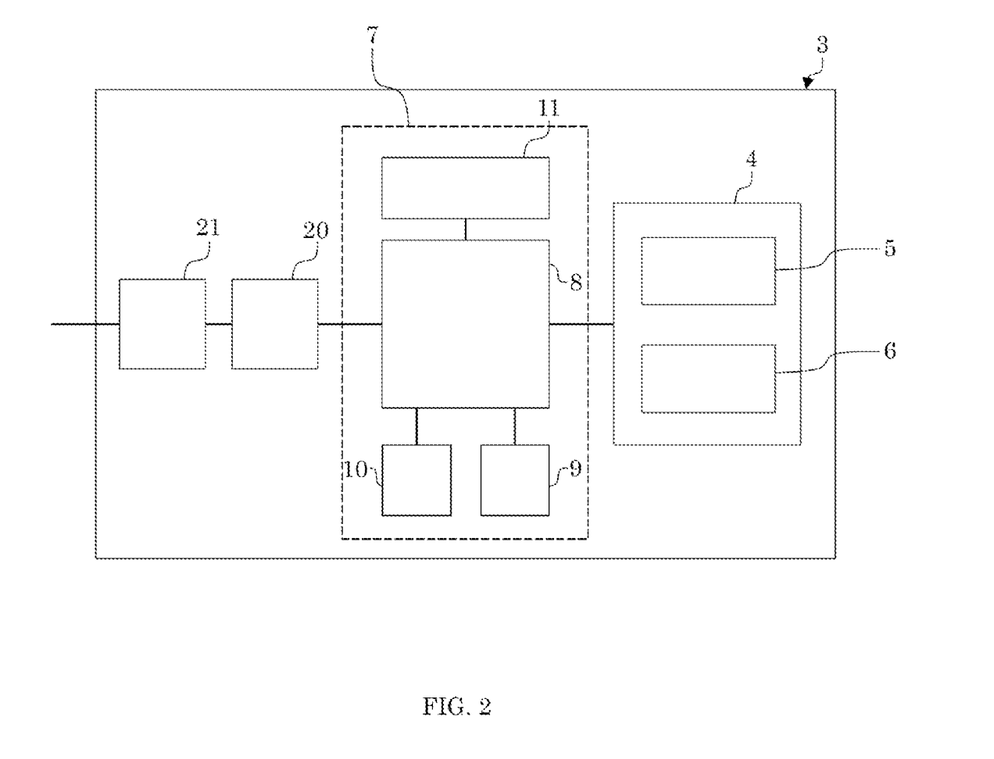
FIG. 2 shows a schematic representation of functional components of the camera device from FIG. 1.

FIG. 2 shows a schematic representation of functional components of the camera device 3 from FIG. 1.

The camera device 3 comprises a camera 4 (image recorder assembly) having an optical system 5 and an image sensor 6. The optical system 5 comprises a lens, for example, in order to capture a scene in front of the vehicle 1 and to image it on the image sensor 6. The image sensor 6 is mounted on a circuit board (image recorder circuit board, not shown), for example. The image sensor 6 is, for example, a CCD (charged coupled device) camera or a CMOS sensor. By way of example, the image sensor 6 is an active pixel sensor (CMOS-APS, CMOS active pixel sensor) produced using CMOS technology. The optical system 5 (e.g. the lens) is mechanically fixed to the circuit board by means of a lens holder (not shown), for example, so that it is arranged in front of the image sensor 6.

The camera device 3 also comprises a further assembly 7, which is electronically connected to the camera 4 (image recorder assembly). The further assembly 7 is mounted, for example, on a main circuit board (not shown). The main circuit board is electrically connected, for example, to the image recorder circuit board by way of a plug-in connection (not shown). By way of example, the main circuit board may be inclined with respect to the image recorder circuit board.

The further assembly 7 comprises a computer unit 8, a memory unit 9, a control unit 10 and a provisioning unit 11. The further assembly 7 may also comprise further electrical and/or electronic components.

The computer unit 8 is, for example, a video processor (microprocessor) that processes images recorded by the camera 4. The images recorded by the camera 4 may be stored in the memory unit 9. In addition, other information may also be stored on the memory unit 9, such as analysis results derived from the recorded images, predetermined values and/or program codes.

The computer unit 8 is configured to execute a program sequence for providing at least part of a driver assistance function on the basis of one or more images recorded by the camera 4.

The driver assistance function is, for example, distance control, lane keeping assistance, lane change assistance, emergency braking assistance, steering assistance, traffic jam assistance and/or high beam assistance. The computer unit 8 executes a program sequence that provides one or more such driver assistance functions.

Figure 3:
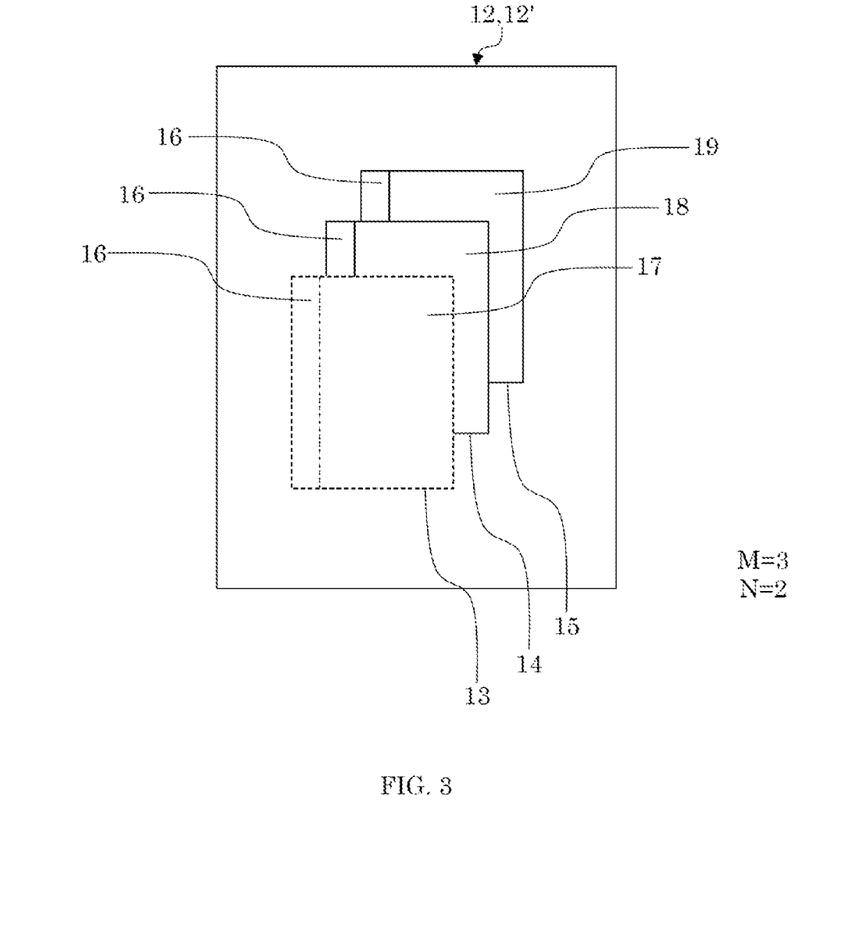
FIG. 3 demonstrates an illustrative program sequence of a computer unit of the camera device from FIG. 1.

FIG. 3 demonstrates an illustrative program sequence 12 having three driver assistance functions 13, 14 and 15 in this example. M denotes the number of driver assistance functions in the program sequence 12. The program sequence 12 is, for example, a program code, software and/or a series of instructions.

By way of example, the driver assistance function 13 is high beam assistance, which may be used to detect an oncoming vehicle in recordings by the camera 4 and to output a control command for switching headlamp light from a high beam setting to a low beam setting.

By way of example, the driver assistance function 14 is lane keeping assistance, which may be used to detect a roadway lane in recordings by the camera 4 and, in the event of departure from the lane, to output a control command for issuing a warning and/or a control command for steering back into the lane.

By way of example, the driver assistance function 15 is emergency braking assistance, which may be used to detect a stationary or moving object in recordings by the camera 4, to determine a distance from the object and to output a control command for braking the vehicle 1.

The provisioning unit 11 of the camera device 3 is configured to provide a temperature for the computer unit 8. The provisioning unit 11 is, for example, a temperature sensor mounted on or integrated in the computer unit 8 (the video processor).

The control unit 10 of the camera device 3 is an electronic control unit configured to alter the program sequence 12 on the basis of the temperature provided by the provisioning unit 11 (the temperature sensor). If, for example, the temperature of the computer unit 8 registered by the provisioning unit 11 exceeds a threshold value, then the control unit 10 alters the program sequence 12, for example in such a way that, of the three driver assistance functions 13, 14 and 15 in FIG. 3, only the two driver assistance functions 14 and 15 are performed. N denotes the number of driver assistance functions in the altered program sequence 12'. In other words, if there is a risk of the computer unit 8 overheating, for example, only a subset of N driver assistance functions from the M driver assistance functions is performed. The computer power of the computer unit 8 and thus the heat generation thereby may therefore be reduced.

The selection regarding which of the M driver assistance functions originally provided in the program sequence 12 are not performed, at least in part, in the event of an excessive temperature in the computer unit 8 is based, for example, on an (e.g. predetermined) assessment of each of the M driver assistance functions as safety-critical or non-safety-critical. By way of example, before the camera device is started up (for the first time) or during vehicle maintenance, it is determined for each of the M driver assistance functions whether or not it is safety-critical.

By way of example, a driver assistance function is determined as being safety-critical if it is suitable for preventing the vehicle 1 from having an accident. By way of example, a driver assistance function is determined as being safety-critical if it is required by law. In the example in FIG. 3, the high beam assistance 13 could be determined as being non-safety-critical, while the lane keeping assistance 14 and the emergency braking assistance 15 could be categorized as safety-critical.

Besides a binary classification as safety-critical or non-safety-critical, a degree of safety relevance for each of the M driver assistance functions could also be predetermined. By way of example, the N driver assistance functions could be selected from the M driver assistance functions according to a predetermined priority list. By way of example, before the camera device is started up (for the first time) or during vehicle maintenance, each of the M driver assistance functions is assigned a value, e.g. a safety relevance value from 1 to 5, that is a measure of the safety relevance of a driver assistance function. By way of example, a safety relevance value of 1 corresponds to very low safety relevance and a safety relevance value of 5 corresponds to very high safety relevance. By way of example, a driver assistance function is predetermined as being all the more safety-critical, or safety-relevant, the more suitable it is for preventing the vehicle 1 from having an accident. By way of example, a driver assistance function is assigned a high safety relevance value in advance if this driver assistance function is required by law. In the example in FIG. 3, the high beam assistance 13 could be predetermined as being slightly safety-critical (safety relevance value 1), the lane keeping assistance 14 as being moderately safety-critical (safety relevance value 3) and the emergency braking assistance 15 as being highly safety-critical (safety relevance value 5).

Then, if the temperature registered for the computer unit 8 exceeds a first threshold value, the program sequence 12 could be altered by way of only the driver assistance functions 14 and 15 being performed in the altered program sequence 12'. If the temperature registered for the computer unit 8 continues to rise and exceeds a second threshold value, the altered program sequence 12' could be altered further so that only the driver assistance function 15 is performed in a second altered program sequence.

The selection regarding which of the M driver assistance functions originally provided in the program sequence 12 are not performed, at least in part, in the event of an excessive temperature in the computer unit 8 may also be made, for example, on the basis of a vehicle state and/or a state of the vehicle surroundings. In the example in FIG. 3, the state of the vehicle surroundings could be assessed as sufficiently light based on daylight so as not to perform the high beam assistance, at least in part, in the event of high temperatures in the computer unit 8.

Another example of a selection of the N driver assistance functions on the basis of a vehicle state and/or a state of the vehicle surroundings is a critical state of the vehicle 1. For example, if the vehicle 1 is found to be straying from its lane, the program sequence 12 could be altered by way of the lane keeping assistance 14 not being shut down and other driver assistance functions being shut down instead. Another example of a critical state of the vehicle is a sensed impending collision by the vehicle with another object. In this case, the program sequence 12 could be altered by way of the emergency braking assistance 15 not being shut down and other driver assistance functions being shut down instead.

The M driver assistance functions in the program sequence 12 may have a joint preprocessing section. This is demonstrated schematically in FIG. 3 by way of an area 16 of each driver assistance function 13, 14 and 15. The joint preprocessing section 16 may consist of basic image processing that can be performed jointly for all or some of the driver assistance functions. The basic image processing may be, for example, image correction with regard to sensor errors, image artifacts, scattered light, contrast, etc. In addition, each of the M driver assistance functions has a main processing section 17, 18, 19. In particular, the main processing sections 17, 18 and 19 are different from one another.

In the case of a joint preprocessing section 16, the program sequence 12 is used to provide the number M of driver assistance functions (13, 14, 15 in FIG. 3) or at least the particular preprocessing section 16 and parts of the respective main processing section (17, 18, 19 in FIG. 3). Additionally, in this case the altered program sequence 12' is used to provide the number N of driver assistance functions (14, 15 in FIG. 3) or at least the particular preprocessing section 16 and parts of the respective main processing section (18, 19 in FIG. 3).

In the case in which the M driver assistance functions in the program sequence 12 have a joint preprocessing section 16, the altered program sequence 12' may consist in all M driver assistance functions (13, 14, 15 in FIG. 3) executing the preprocessing section 16, but a main processing section 17, 18, 19 being executed only by a subset N of the driver assistance functions. By way of example, the driver assistance function 15 in the altered program sequence 12' is performed completely, i.e. including the preprocessing section 16 and the main processing section 19. Furthermore, the driver assistance function 14, for example, in the altered program sequence 12' is also performed completely, i.e. including the preprocessing section 16 and the main processing section 18. In contrast, the driver assistance function 13, for example, in the altered program sequence 12' is performed only in part, specifically the driver assistance function 13 executes only the preprocessing section 16, but not the main processing section 17.

In another embodiment, the control unit 10 is configured to slow down the program sequence 12 on the basis of the temperature of the computer unit 8 provided by the provisioning unit 11 (temperature sensor). By way of example, the control unit 10 is configured to slow down the program sequence 12 for all driver assistance functions 13, 14 and 15 equally. By way of example, the frame rate of the camera 4 may be slowed down, with the result that the number of images to be processed by the computer unit 8 per unit time is reduced. Alternatively or additionally, the clock rate of the computer unit 8 could be slowed down.

As shown in FIG. 2, the camera device 3 also comprises a microcontroller 20, which is electronically connected to the further assembly 7, for example to the computer unit 8. Moreover, the camera device 3 comprises a data transmission interface 21, for example a bus system, for transmitting data to other systems of the vehicle 1, for example to a central computing unit of the vehicle 1 (not shown) and/or to a headlamp system of the vehicle 1, a steering system of the vehicle 1, a braking system of the vehicle or other control systems of the vehicle 1.

By way of example, a bus system 21 is used to output control commands from the computer unit 8 to a headlamp system of the vehicle 1 for switching headlamp light from a high beam setting to a low beam setting. By way of example, the bus system 21 is used to output control commands from the computer unit 8 to a steering system of the vehicle 1 for steering back into a roadway lane. By way of example, the bus system 21 is used to output control commands from the computer unit 8 to a braking system of the vehicle 1 for braking the vehicle 1.

Figure 4:
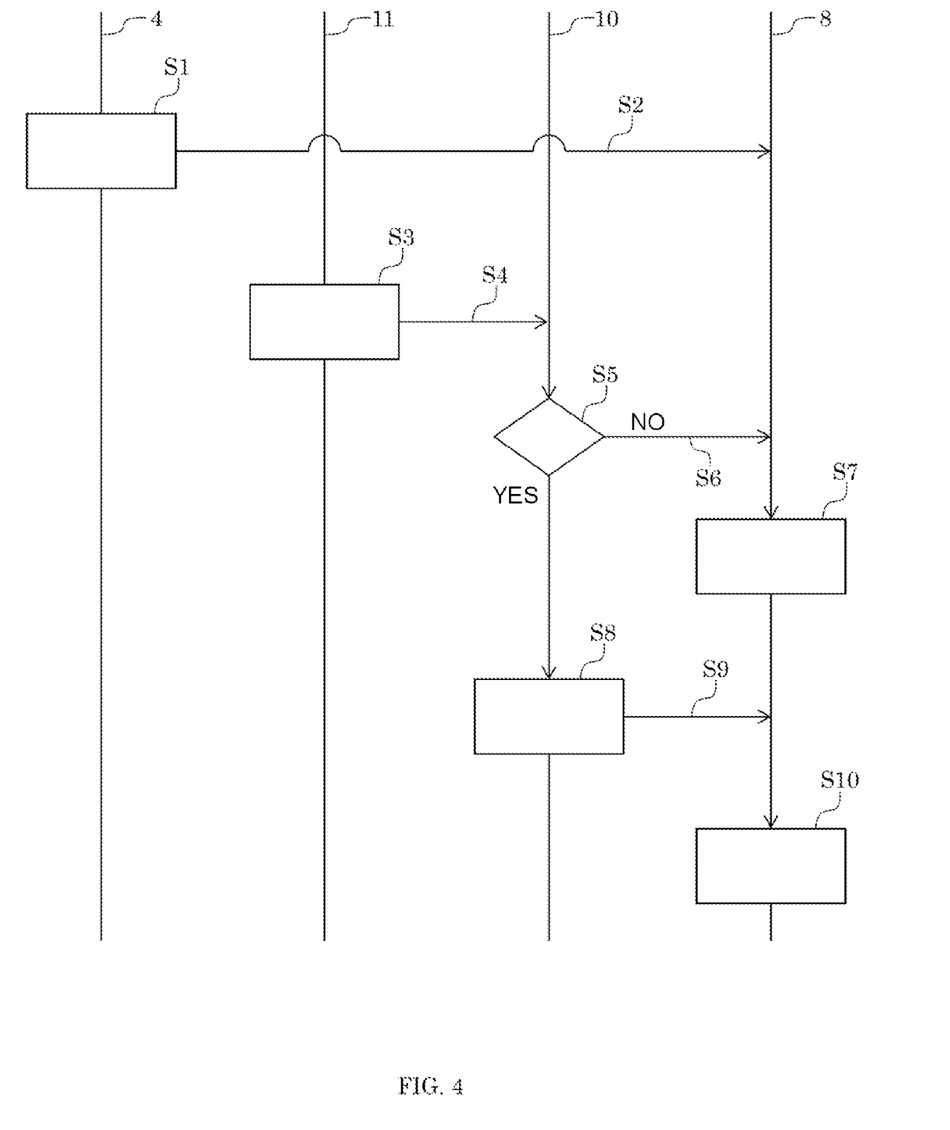
FIG. 4 shows a flowchart for a method for operating the camera device from FIG. 1.

FIG. 4 shows a flowchart for a method for operating the camera device 3.

In step S1, the camera 4 records one or more images (in particular a video) of the surroundings of the vehicle 1.

In step S2, the camera 4 transfers the one or more images to the computer unit 8.

In step S3, the provisioning unit 11 provides the temperature of the computer unit 8. By way of example, the provisioning unit 11 is a temperature sensor mounted on the computer unit 8 that measures the temperature of the computer unit 8.

In step S4, the provisioning unit 11 transfers the temperature provided (e.g. measured) for the computer unit 8 to the control unit 10.

In step S5, the control unit 10 ascertains whether the provided temperature of the computer unit 8 is greater than a predefined threshold value.

If, in step S5, the control unit 10 ascertains that the temperature provided for the computer unit 8 is less than or equal to the predefined threshold value ("NO" in step S5), then the control unit 10 transfers a control command to execute the program sequence 12 to the computer unit 8 in step S6.

In this case, the computer unit 8 executes the program sequence 12 in step S7. This means that the computer unit 8 executes the unaltered program sequence 12. In the example in FIG. 3, the computer unit 8 thus executes the program sequence 12 for providing at least part of each of the driver assistance functions 13, 14 and 15 in step S7.

If, in step S5, the control unit 10 ascertains that the temperature provided for the computer unit 8 is greater than the predefined threshold value ("YES" in step S5), then the control unit 10 alters the program sequence 12 to the altered program sequence 12' in step S8.

In this case, the control unit 10 transfers a control command to execute the altered program sequence 12' to the computer unit 8 in step S9.

Furthermore, in this case the computer unit 8 executes the altered program sequence 12' in step S10.

It is noted that steps S1 and S2 of recording one or more images and transferring the images to the computer unit 8 may be performed repeatedly, for example continuously. Based on the images transferred, the computer unit 8 executes the program sequence 12 in step S7 or the altered program sequence 12' in step S10, depending on which control command it last received from the control unit 10 in step S6 or S9.

Steps S3 to S5 of providing the temperature by way of the provisioning unit 11, transferring the temperature to the control unit 10 and comparing the temperature transferred with a predefined threshold value by way of the control unit 10 may also be performed repeatedly, for example continuously. Depending on the decision in step S5, steps S6 and S7 or S8, S9 and S10 are then also performed repeatedly.

Although the present invention has been described on the basis of exemplary embodiments, it may be modified in many ways.

LIST OF REFERENCE SIGNS 1 vehicle
2 windshield
3 camera device
4 camera
5 optical system
6 image sensor
7 assembly
8 computer unit
9 memory unit
10 control unit
11 provisioning unit 12 program sequence
12' altered program sequence
13 driver assistance function
14 driver assistance function
15 driver assistance function
16 preprocessing section
17 main processing section
18 main processing section
19 main processing section
20 microcontroller
21 data transmission interface
M number
N number
S1-S10 method steps

The invention claimed is:

1. A camera device for a vehicle, comprising:
a camera for recording an image;
a computer unit for executing a program sequence for providing at least part of a driver assistance function on the basis of the recorded image,
a provisioning unit for providing a temperature for the computer unit, and
a control unit, which is configured to alter the program sequence on the basis of the temperature provided,
wherein the computer unit is configured to execute the altered program sequence,
wherein the program sequence comprises a program sequence for providing a number M of driver assistance functions on the basis of the recorded image, and
wherein each of the M driver assistance functions includes a joint preprocessing section, for basic image processing to be performed jointly with one or more of the other M driver assistance functions.

2. The camera device as claimed in claim 1, wherein the control unit is configured to alter the program sequence in such a way that a power consumption of the computer unit is reduced at least during the execution of the altered program sequence.

3. The camera device as claimed in claim 1, wherein the control unit is configured to slow down the program sequence on the basis of the temperature provided.

4. The camera device as claimed in claim 3, wherein the control unit is configured to slow down the program sequence by reducing a clock rate of the computer unit and/or by reducing a frame rate of the camera.

5. The camera device as claimed in claim 1, wherein the control unit is configured to alter the program sequence for the duration of a vehicle state and/or a state of the vehicle surroundings.

6. The camera device as claimed in claim 1, wherein:
the altered program sequence comprises a program sequence for providing a number N of driver assistance functions or at least particular parts thereof, and
N is smaller than M and/or the M driver assistance functions include the N driver assistance functions.

7. The camera device as claimed in claim 6, wherein the N driver assistance functions are safety-critical and the M driver assistance functions comprise at least one non-safety-critical driver assistance function.

8. The camera device as claimed in claim 6, wherein the computer unit and/or the control unit is configured to select the N driver assistance functions from the M driver assistance functions on the basis of a vehicle state and/or a state of the vehicle surroundings.

9. The camera device as claimed in claim 1, wherein the driver assistance function or one, several or all of the M and/or N driver assistance functions comprises communicating information and/or warning the driver of the vehicle and/or intervening in driving of the vehicle.

10. The camera device as claimed in claim 1, wherein the computer unit comprises an image processor and/or video processor.

11. The camera device as claimed in claim 1, wherein the provisioning unit comprises a temperature sensor for providing the temperature of the computer unit.

12. The camera device as claimed in claim 1, wherein the control unit is configured to alter the program sequence if the temperature provided is higher than a threshold value.

13. A motor vehicle having a camera device as claimed in claim 1.

14. The camera device as claimed in claim 1, wherein each of the M driver assistance functions is assigned a safety relevance value, that is a measure of safety relevance of the driver assistance function.

15. A method for operating a camera device in a vehicle, the method comprising:
recording an image using a camera,
executing a program sequence to provide at least part of a driver assistance function on the basis of the recorded image,
providing a temperature for the computer unit,
altering the program sequence on the basis of the temperature provided, and
executing the altered program sequence,
wherein the program sequence comprises a program sequence for providing a number M of driver assistance functions on the basis of the recorded image, and
wherein each of the M driver assistance functions includes a joint preprocessing section, for basic image processing to be performed jointly with one or more of the other M driver assistance functions.

16. The method as claimed in claim 15, wherein each of the M driver assistance functions is assigned a safety relevance value, that is a measure of safety relevance of the driver assistance function.

17. A non-transitory computer-readable storage medium, having computer-readable instructions stored thereon that, when the program is executed by a computer, cause said computer to carry out the method as claimed in claim 15.

* * * * *